US006853869B1

(12) United States Patent
Nishioka

(10) Patent No.: US 6,853,869 B1
(45) Date of Patent: Feb. 8, 2005

(54) METHOD AND APPARATUS FOR GENERATING SURROUND-SOUND DATA

(75) Inventor: Kei Nishioka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 621 days.

(21) Appl. No.: 09/715,414

(22) Filed: Nov. 17, 2000

(30) Foreign Application Priority Data

Nov. 17, 1999 (JP) .......................................... 11-326250

(51) Int. Cl.[7] .............................................. G06F 17/00
(52) U.S. Cl. ............................ 700/94; 381/17; 381/18; 381/61; 381/1
(58) Field of Search ............................. 700/94; 381/17, 381/18, 61, 63, 1, 310, 106; 84/630; 333/14; 704/500, 501, 504

(56) References Cited

U.S. PATENT DOCUMENTS 5,228,059 A * 7/1993 Takegahara et al. ........ 375/287
5,394,474 A * 2/1995 Hirai et al. .................. 381/63
6,304,714 B1 * 10/2001 Krause et al. ................ 386/52
6,311,092 B1 * 10/2001 Yamada ....................... 700/94
6,665,409 B1 * 12/2003 Rao ........................... 381/63

FOREIGN PATENT DOCUMENTS

JP 04339500 A * 11/1992 ............ H04S/5/02

* cited by examiner

*Primary Examiner*—Xu Mei
*Assistant Examiner*—Justin Michalski
(74) *Attorney, Agent, or Firm*—Hogan & Hartson LLP

(57) ABSTRACT

A surround-sound circuit has a delay time memory (31) for storing a digital audio input signal IN, and outputs the stored input signal as a surround-sound signal a predetermined time later. The input signal is compressed by a compressor (32) in the form of ADPCM encoder before it is stored in the memory (31), and the compressed signal retrieved from the memory is expanded by an expander (33) in the form of ADPCM decoder before it is added to the input signal. The invention may reduce appreciably the amount of data to be stored in the memory, and hence the storage capacity of the RAM, without directly loping the audio input signal IN and hence avoiding appreciable deterioration of the signal IN.

5 Claims, 7 Drawing Sheets

PRIOR ART

PRIOR ART

METHOD AND APPARATUS FOR GENERATING SURROUND-SOUND DATA

FIELD OF THE INVENTION

The invention relates to a method and an apparatus for processing digital data of a music for example, and more particularly, to a circuit for generating a surround-sound or echo by means of a memory for delaying the surround-sound data.

BACKGROUND OF THE INVENTION

A typical conventional circuit for generating a surround-sound (hereinafter referred to as surround-sound circuit) includes a RAM 11 (hereinafter referred to as delay RAM) and a digital signal processing circuit 12, as shown in FIG. 1. The delay RAM 11 and the digital signal processing circuit 12 are provided to generate a surround-sound as follows.

The audio input signal IN input to the digital signal processing circuit 12 is first written in the delay RAM 11, as seen in FIG. 1, for holding the data for a predetermined period of time, from which the signal is read out at the end of the period and added to the current input signal IN as a surround-sound signal.

Such a conventional surround-sound circuit as shown in FIG. 1 has an obvious drawback that the audio input signal IN is directly written in the delay RAM 11, so that the delay RAM 11 must have a disadvantageously large storage capacity.

FIG. 2 shows another conventional surround-sound circuit which includes a down-sampling converter 23 for lopping off part of the audio input signal IN to reduce the sampling frequency to one half of the original frequency, for example, of the audio input signal IN before writing the audio input signal IN in the delay RAM 21. The surround-sound circuit is also provided with an over-sampling converter 24 which steps up the sampling frequency of the down-sampled data when the down-sampled data is retrieved from the delay RAM 21 a predetermined time later. The over-sampling is made by interpolating the down-sampled data. The interpolated data is then added to the current audio input signal IN as a surround-sound signal. This approach is useful in reducing the required storage capacity of the delay RAM 21. However, the surround-sound is much degraded compared with the original audio input signal due to the down-sampling and the over-sampling.

Thus, conventional surround-sound circuits have disadvantages in that they require a large memory to store the audio input signals IN or they must tolerate degradation of the surround-sound caused by lopping of data.

It is therefore an object of the invention to provide a method and an apparatus for generating a high-quality surround-sound signal with a greatly reduced storage capacity RAM, without lopping the audio input signal.

SUMMARY OF THE INVENTION

In accordance with one aspect of the invention, as pointed out in claim 1, there is provided a method of generating surround-sound data including steps of: storing a digital input/output signal in a memory; retrieving said input/output signal stored from said memory a predetermined time later; and adding said retrieved input/output signal to said digital input signal to generate an output signal, said method characterized in that:

said input/output signal to be stored in said memory is compressed by digital compression means before said input/output signal is stored in said memory; and said input/output signal retrieved from said memory is expanded by digital expansion means before said input/output signal is added to said output signal.

In accordance with another aspect of the invention, as pointed out in claim 2, there is provided an apparatus for generating a surround-sound signal from a digital signal input thereto, and providing an output signal derived from said input signal, said apparatus comprising:

digital compression means for compressing said input/output signal;

a memory for storing said compressed input/output signal until said compressed input/output signal is retrieved a predetermined time later;

digital expansion means for expanding said compressed input/output signal retrieved from said memory;

an adder for adding said expanded input/output signal to the current input signal.

Thus, the invention pointed out in claims 1 and 2 effectively provides a surround-sound or echo for an input musical digital signal for example by compressing a signal tapped from the input signal and storing the compressed signal in a delay memory, retrieving and expanding the compressed signal a predetermined time later, and adding the expanded signal to the input signal. It can be understood that the invention advantageously reduces a great deal the amount of data to be stored in the memory without loping or degrading the input digital signal.

In accordance with a further aspect of the invention, as pointed out in claim 3, the surround-sound signal generating apparatus may comprise a differential pulse code modulation (DPCM) encoder as the digital compression means, and a DPCM decoder as the digital expansion means.

Use of such a DPCM encoder as the digital compressor and a DPCM decoder as the digital expander enables minimization of the necessary storage capacity of the memory used and of degradation of the surround-sound signal.

The surround-sound signal generating apparatus of the invention as pointed out in claim 2 may further comprise a delay time controller for generating a delay time instruction, so that said predetermined time for retrieving said compressed input/output signal from said memory is controlled by said delay time instruction, as pointed out in claim 4.

In the surround-sound signal generating apparatus of the invention, the number of data bits output from said digital compression means may be varied in accordance with said delay time instruction, as pointed out in claim 5.

Thus, the surround-sound of the invention can be controlled by a user as he wishes by controlling the delay time controller. Furthermore, the memory can be effectively utilized within a given capacity in storing larger bits of data through adjustment of the data bits of the output of the compression means based on the delay time. Allowance of larger data bits helps to minimize the degradation of the surround-sound signal.

DETAILED DESCRIPTION OF THE PREFERRED EMBODIMENT

Figure 1:
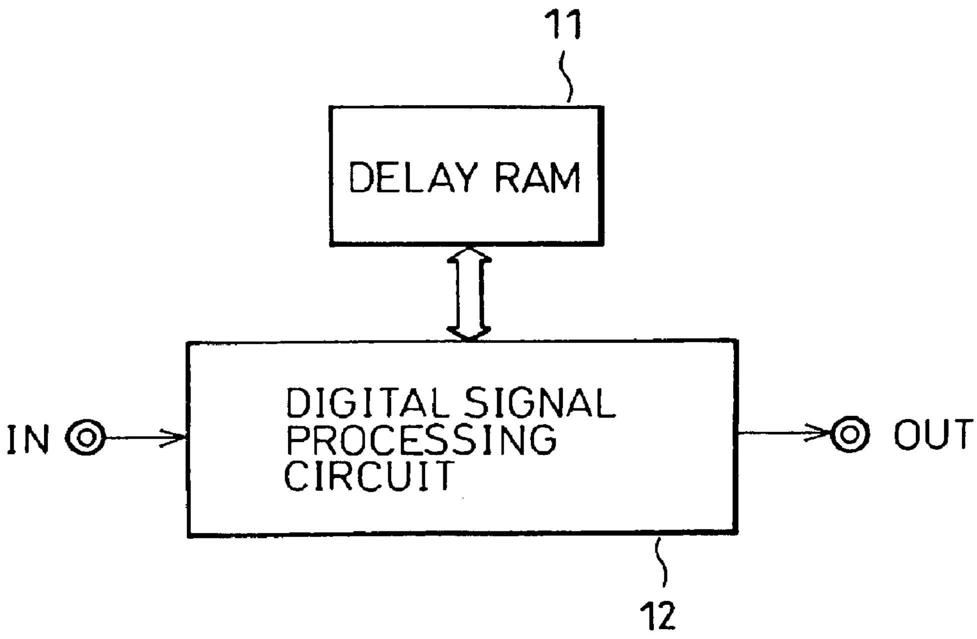
FIG. 1 is a block diagram of a conventional surround-sound circuit.
Figure 2:
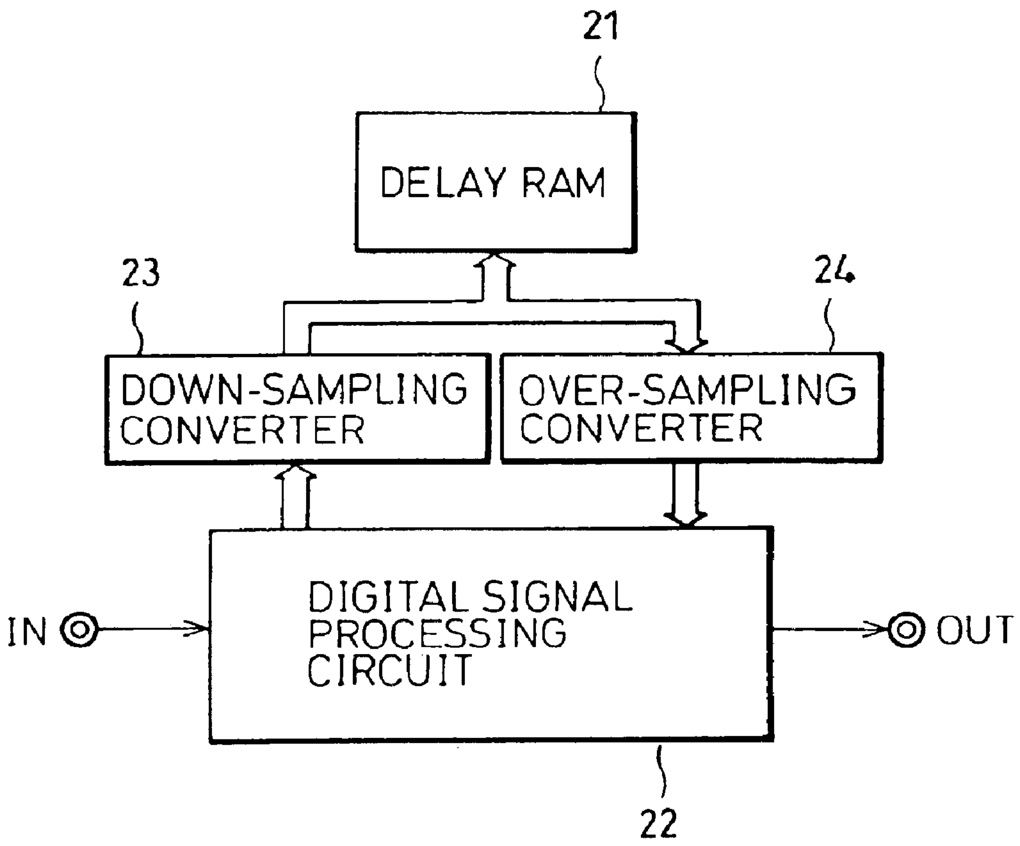
FIG. 2 is a block diagram of another conventional surround-sound circuit.
Figure 3:
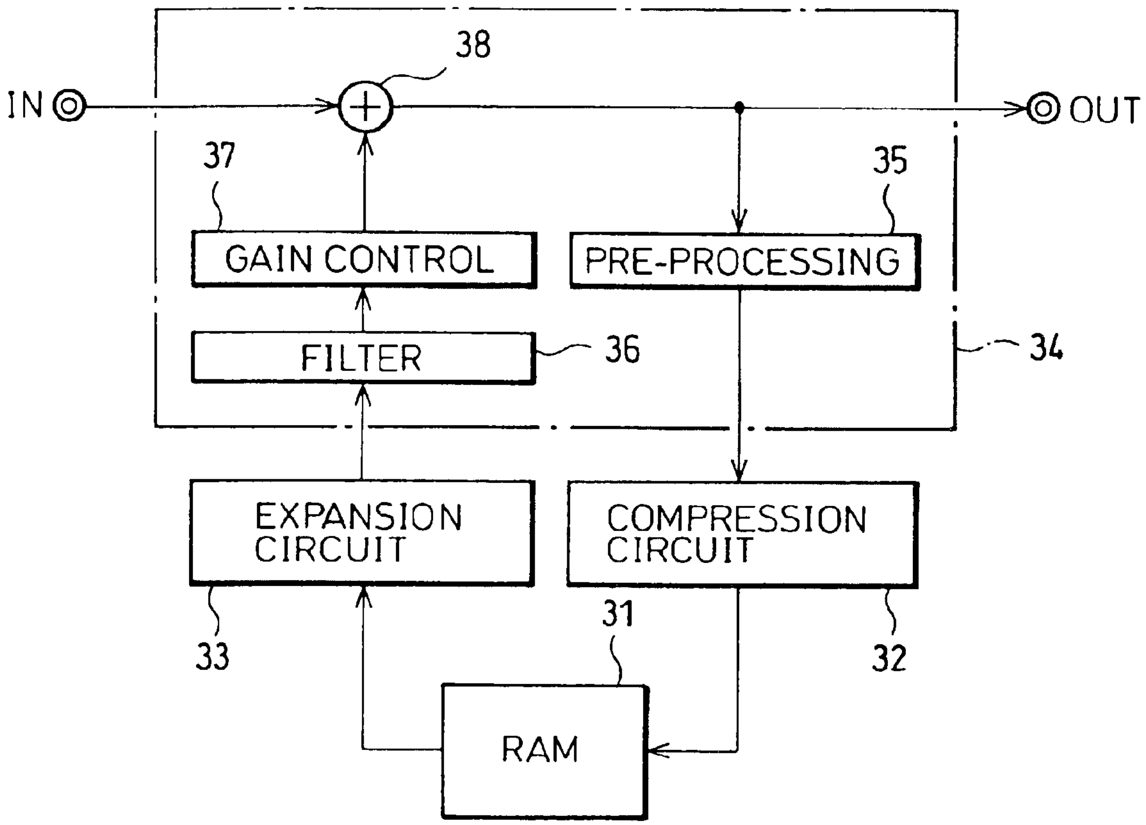
FIG. 3 is a block diagram of a surround-sound circuit according to the invention.

Referring now to FIG. 3, there is shown a surround-sound circuit of the invention. The circuit receives a digital audio input signal IN and generates a digital audio output signal OUT which includes a surround-sound signal generated from the audio output signal OUT and added to the input signal IN a predetermined time later as described in detail below.

To generate the surround-sound signal, the audio output signal OUT is tapped into a pre-processing circuit 35, where low-frequency components of the tapped signal are removed since they are not necessary for the surround-sound. The pre-processed audio output signal is then compressed in a prescribed manner by a digital compression circuit 32 to reduce the amount of data associated with the audio input signal received. The compressed audio output signal OUT is transferred from the compression circuit 32 into a delay RAM 31.

The compressed audio output signal OUT stored in the delay RAM 31 is retrieved therefrom a predetermined time later into a digital expansion circuit 33, where the data is expanded and restore the original form of the audio output signal. The data restored by the expansion circuit 33 is passed to a filter 36 for filtering out frequency components that are not necessary for the surround-sound, and then to a gain control circuit 37 for controlling the gain of the surround-sound circuit. The data is then supplied to one input end of an adder 38 so that it is added to the current audio input signal IN as a surround-sound signal. The gain control circuit 37 is provided to control the level of the surround-sound, so that a user can control the surround-sound effect as he wishes.

In the adder 38, the audio input signal IN and the output of the gain control circuit 37, i.e. the surround-sound signal, are added together, forming the audio output signal OUT. It is noted that the pre-processing circuit 35, the filter 36, the gain control circuit 37, and the adder 38 constitute a digital signal processing circuit 34.

In this manner, in generating the audio output signal OUT having a surround-sound or echo, the audio output signal OUT is processed by the pre-processing circuit 35, compressed by the compression circuit 32, stored in the delay RAM 31, and output from the delay RAM a predetermined delayed time later.

In general, the storage capacity required for the delay RAM 31 depends on the delay time, i.e. the period of time for data to be stored in the memory, and the data rate, i.e. the amount of data received by the memory per unit time.

The delay time can be also controlled by the user for his preference. Appropriate delay time is in the range from about 5 ms to 100 ms, so that the delay RAM 31 preferably has a storage capacity to hold data for an anticipated maximum delay time of about 100 ms.

It should be understood that the total amount of data received per unit time is enormous, so that the storage capacity of the delay RAM must be very large if it must store therein the entire data. On the other hand, if the data is reduced by lopping to one half, say, to the size of the data received, the data will suffer degradation when it is restored to the original size by interpolation.

The invention avoids direct reduction of data by lopping, but instead carries out indirect reduction of data through compression by means of the compression circuit 32 and subsequent expansion of the data by the expansion circuit 33, as shown in FIG. 3, thereby minimizing the degradation of the data.

The degree of compression attained by a compression circuit used is a trade-off between the requirement of storage capacity and the cost for the storage capacity of the delay RAM 31. The invention employs adaptive differential pulse code modulation (ADPCM) for compression (and hence expansion) of data to minimize the amount of data to be stored in the delay RAM 31 while minimizing deterioration of the data, so that an ADPCM encoder and an ADPCM decoder are used as the compression circuit 32 and the expansion circuit 33, respectively.

It is noted that although the digital output signal OUT is used as a source of the surround-sound signal in the example shown in FIG. 3., the digital input signal IN can be alternatively used as the source of the surround-sound signal.

Referring to FIGS. 4 through 7, details of a surround-sound generation apparatus of the invention having a compression circuit 32 in the form of ADPCM encoder and an expansion circuit 33 in the form of ADPCM decoder will now be described below.

Figure 4:
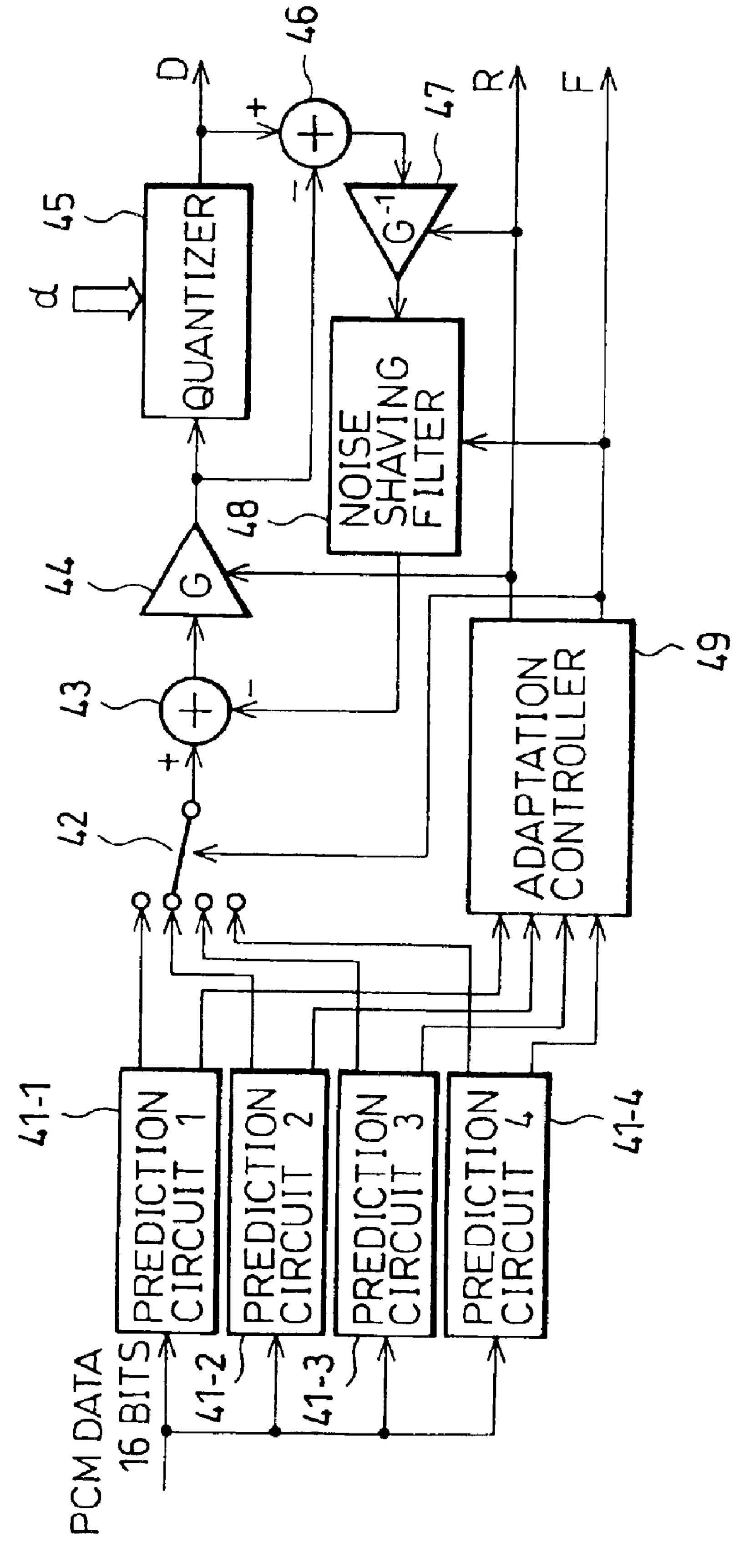
FIG. 4 is a block diagram of an adaptive differential pulse code modulation (ADPCM) encoder for use in the invention.

FIG. 4 shows an ADPCM encoder adapted to receive 16 bit PCM input data, which is compressed in data size, through quantization of a predictive error therefor, to data having a number of bits in the range from 4 to 8 before it is stored in the RAM 31.

To do this, 16 bit PCM input data is first entered in four prediction circuits 41-1–41-4. Each of the prediction circuits 41-1–41-4 is a second order finite impulse response (FIR) filter comprising two delay circuits, two factor multiplication circuits, two adders, and a peak hold circuit. These prediction circuits 41-1–41-4 have different frequency characteristics.

Each of the prediction circuits 41-1–41-4 provides, for each sample, second order prediction data which is obtained by subtracting the current input data from the delayed input data multiplied by the multiplication factor of the prediction circuit. Each of the prediction circuits 41-1–41-4 also provides, for each sound unit (containing 28 samples in the example shown herein), prediction circuit control information and step-size control information (such as for example maximum value of the predicted data). The information issued from each of the prediction circuits 41-1–41-4 is supplied to an adaptation controller 49 in order to select the most appropriate prediction circuit that offers the best prediction, that is, the least difference. The selection is performed at a regular time interval (e.g. for every sound unit comprising 28 data samples). The magnitude of the prediction data can differ from one prediction circuit to another, but normally they are sufficiently small.

In order to perform appropriate encoding, a switch 42 is connected with the prediction data terminal of the prediction circuit selected by the adaptation controller 49. At the same time, the step-size control information R and the prediction circuit control information F are also provided on the respective information lines by the adaptation controller 49.

The selected prediction data is supplied to an adder 43 where the noise-shaved data fed back from a noise shaving filter 48 is subtracted from the predicted data. The resultant data is then quantized by a quantizer 45 in collaboration with a variable amplifier 44, as described below.

In the variable amplifier 44, the noise-shaved data is amplified to a required level based on the step-size control information R before it is supplied to the quantizer 45. It is noted that the number of bits of the data under processing remains unchanged (16 bits) so far, irrespective of the magnitude of the input PCM data.

The quantizer 45 rounds down the data it receives to a number having 4–8 digits by taking the upper most 4–8 digits of the data in accordance with an externally supplied bit number designation instruction $\alpha$.

It is noted that the noise shaving filter 48 is a second order FIR digital filter comprising two delay circuits, two factor multiplication circuits controlled by the prediction circuit control information F, and an adder. The noise shaving is performed to mask quantization noises (generated during the quantization of the data) by feeding them back to the quantizer 45. To do this, the input and the output signals of the quantizer 45 are supplied to an adder 46 to calculate the difference between them, which difference is attenuated by an attenuator 47 based on the step-size control information R and supplied to the noise-shaving filter 48.

Compressed data D, output from the quantizer 45 for every sample as the output of the ADPCM encoder, is supplied to the RAM 31 for each sound unit, together with the prediction circuit control information F and the step-size control information R. The data D may be accompanied by identification information for identifying a given bit number designation instruction $\alpha$ stored in the RAM 31, as needed.

Figure 5:
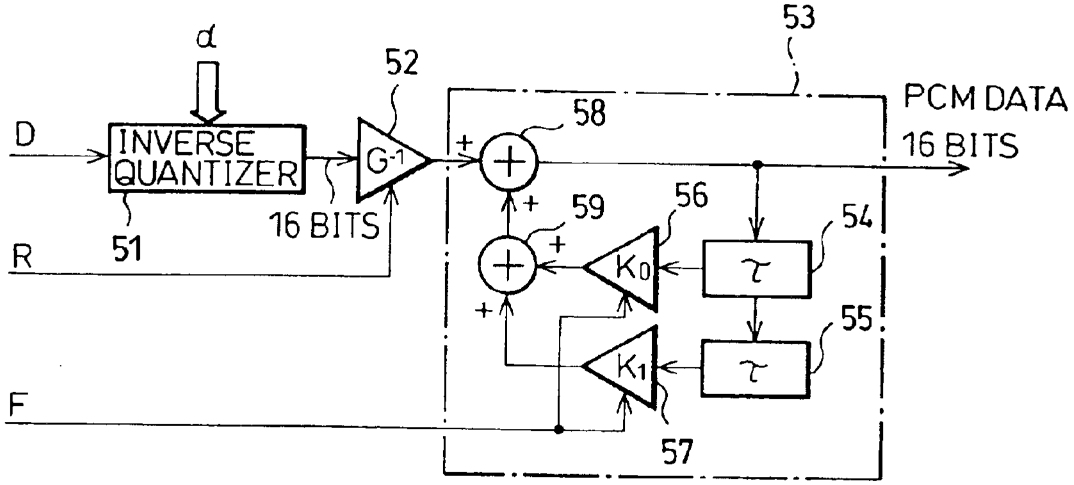
FIG. 5 is a block diagram of an adaptive differential pulse code modulation (ADPCM) decoder for use in the invention.

FIG. 5 shows the structure of an ADPCM decoder of the invention, which expands the compressed data, retrieved from the RAM 31 and having 4–8 bits in accord with a given bit setting instruction $\alpha$, to the original 16 bit PCM data.

To do this, the data D (having a bits) for each sample is sequentially read out from the RAM 31 and entered in the ADPCM decoder shown in FIG. 5 together with the prediction circuit control information F and the step-size control information R for the sound unit to which the data D belongs.

The decoder shown in FIG. 5 performs inverse quantization of the supplied data D (having a bits), expanding the data back to 16 bit data in accordance with the prediction circuit control information F and the bit number designation instruction $\alpha$ as follows. The inverse quantization is the inverse operation to the quantization described in connection with FIG. 4, carried out by an inverse quantizer 51 and an attenuator 52 having variable attenuation. That is, the inverse quantizer 51 adds to the supplied data D a required number (16-$\alpha$) of lower bits, converting the data D to a 16 bit data based on the bit number designation instruction $\alpha$. In accordance with the step-size control information R, the attenuator 52 attenuates the 16 bit data supplied thereto. The output of the attenuator 52 corresponds to the difference data output from associated one of the prediction circuits of the encoder shown in FIG. 4.

The output of the attenuator 52 is supplied to a second order infinite impulse response (IIR) digital filter 53. The IIR digital filter 53 consists of delay circuits 54 and 55, factor multiplication circuits 56 and 57, and adders 58 and 59. The two factor multiplication circuits 56 and 57 are provided with the same prediction circuit control signal F as provided to the currently selected one of the prediction circuits 41-1–41-4.

The output of the attenuator 52 is decoded by the IIR digital filter 53 to a 16 bit output PCM data.

Incidentally, since the inverse quantizer 51 simply adds to the data D the predetermined number (16-$\alpha$) of lower bits, the inverse quantizer 51 is preferably incorporated in the attenuator 52. In this case, the attenuator 52 performs the attenuation and the inverse quantization described above.

The attenuator 52 may be controlled not only by the step-size control information R but also by a gain control signal as set by the user in a manner he wishes. In this case, the gain control circuit 37 of FIG. 3 can be omitted.

Figure 6:
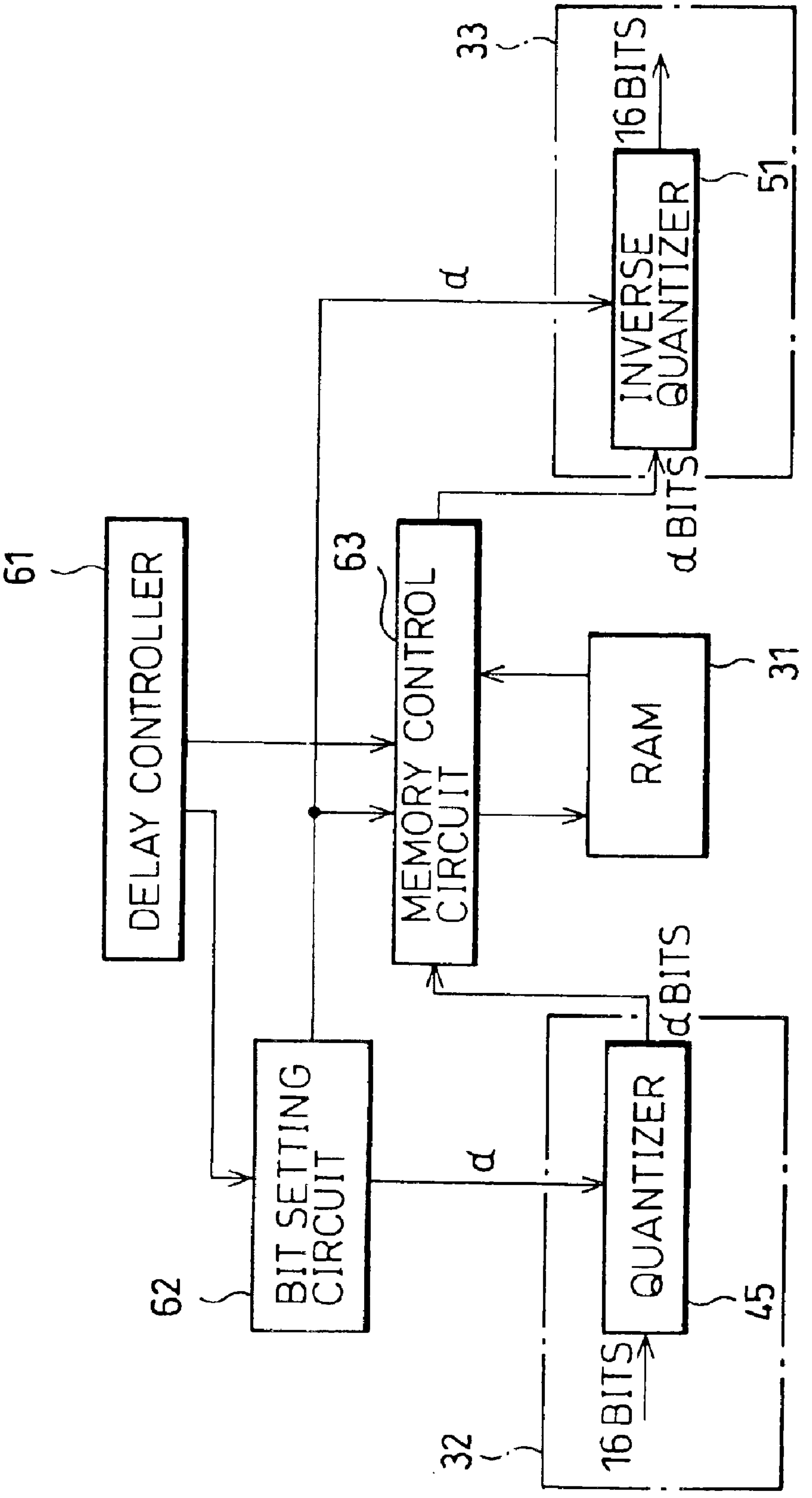
FIG. 6 is a block diagram of a major section of a delay controller of the invention.
Figure 7:
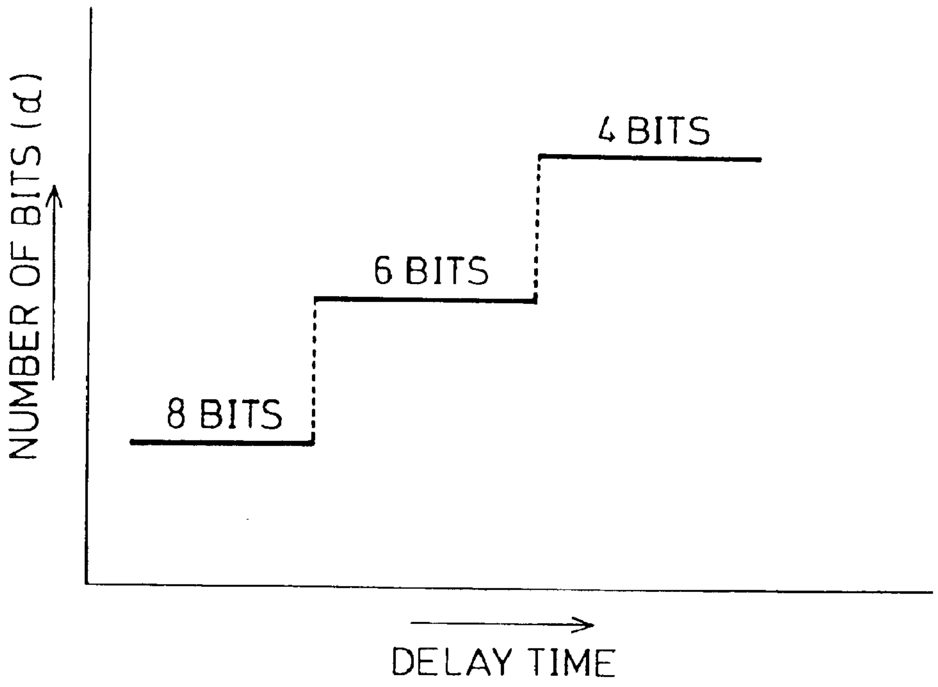
FIG. 7 is a graphical representation of the relationship between the delay time and the number of bits of a compressed signal according to the invention.

Referring to FIGS. 6 and 7, a delay control procedure of the invention will now be described. FIG. 6 shows major portion of the delay control circuit. FIG. 7 shows the delay time of the delay RAM 31 as a function of the number of bits set for the compression circuit 32 (ADPCM encoder) and the expansion circuit 33 (ADPCM decoder).

A delay controller 61 shown in FIG. 6 issues a delay time instruction defining a period of time for the surround-sound signal to stay in the RAM 31 (between the time the data is output from the ADPCM encoder 32 and the time the data is retrieved from the RAM 31). The delay time instruction issued from the delay controller 61 is supplied to a memory control circuit 63 which causes the compressed data to be stored in the RAM 31 and retrieved therefrom as instructed by the delay time instruction.

At the same time, the delay time instruction issued by the delay controller 61 is also supplied to a bit setting circuit 62. The bit setting circuit 62 establishes a bit setting instruction $\alpha$ indicative of the number of bits a that will survive in the quantization operation executed by the quantizer 45 of the ADPCM encoder 32 in response to the delay time instruction received from the delay controller 61. The bit setting instruction $\alpha$ is also supplied to the inverse quantizer 51 of the ADPCM decoder 33. The bit setting instruction $\alpha$ is also supplied to a memory control circuit 63 when writing and reading the compressed data to/from the RAM 31.

It will be understood that the bit setting instruction $\alpha$ need not be provided to the inverse quantizer 51 of the decoder 33 if an identification information for identifying the bit setting instruction $\alpha$ in the RAM 31, is stored in the RAM 31 together with the compressed data D output from the ADPCM encoder.

The bit setting instruction $\alpha$ is established by the bit setting circuit 62 such that a larger number of bits $\alpha$ is set step-wise for a shorter delay time as instructed by the delay controller 61, as shown in FIG. 7.

The required storage capacity of the RAM 31 depends on the delay time (i.e. period of time that the data be stored in the RAM 31) and the amount of data input to the circuit per unit time. Consequently, the RAM 31 preferably has a sufficient storage capacity for storing a prescribed number of bits (4 bits for example) of data required for a desirable surround-sound for any anticipated delay time (ranging from 10 ms to 100 ms for example).

It should be noted that if a short delay time is set, the RAM 31 has a good margin in memory.

Therefore, the surround-sound circuit of the invention has a feature that, in addition to provision of a sufficient storage capacity of the RAM 31 to hold any anticipated data for a maximum anticipated delay time, the memory control circuit is adapted to set a larger number of bits for a shorter delay time, thereby reducing on one hand the quantization errors made in the encoder 32 and on the other hand allowing efficient use of the RAM 31.

The surround-sound obtained by the ADPCM compression and expansion according to the invention has substantially the same quality as that of ordinary analog records and cassette tapes, which is good enough for a surround-sound since the surround-sound has a minor level than the audio input signal IN and is always superposed on the latter signal.

The data compression ratio of the circuit depends on several parameters involved in the compression. In the example shown herein, the data is compressed to ¼ or less of the original data.

It would be clear that the invention can be applied to a stereo sound system equally well. In that case, the user can control the balancing ratio of the surround-sound in the right channel R to that in the left channel L, the level of the surround-sound in a bass region as well as in a treble region, as he wishes.

Although the invention has been described with particular reference to a certain preferred embodiment, variations and modifications of the present invention can be effected within the scope of the invention. For example, the ADPCM compression and expansion may be replaced by DPCM compression and expansion and other digital compression and expansion techniques.

What is claimed is:

1. A method of generating surround-sound data including steps of:

providing a memory which has a sufficient storage capacity for storing a number of bits of data required to maintain a surround-sound for a maximum anticipated delay time;

supplying an instruction delay time voluntarily adjustable within a range of anticipated delay time;

determining the number of compression bits based on said instruction delay time and said storage capacity;

compressing digital input/output signal to a compressed digital signal with the determined number of compression bits, thereby supplying the compressed digital signal to said memory;

outputting said compressed digital signal retrieved from said memory said instruction delay time later as expanded digital signal after expanding; and adding said digital input signal and said expanded digital signal to output as said digital output signal.

2. The method according to claim 1, wherein said number of compression bits is obtained by dividing said storage capacity by said instruction delay time.

3. An apparatus for generating a surround-sound signal from a digital signal input thereto, and providing an output signal derived from said input signal, said apparatus comprising:

delay time adjusting means to supply an instruction delay time;

a memory having a sufficient storage capacity for storing a number of bits of data required to maintain a surround-sound for a maximum anticipated delay time, and storing compressed digital signal until said compressed digital signal is retrieved said instruction delay time later;

digital compression means for compressing digital input/output signal to said compressed digital signal of the number of compression bits determined based on said instruction delay time and said storage capacity, and for supplying the compressed digital signal to said memory;

digital expansion means for expanding said compressed digital signal retrieved from said memory said instruction delay time later; and an adder for adding said expanded digital signal to the current input digital signal.

4. The apparatus according to claim 3, wherein said digital compression means is a differential pulse code modulation (DPCM) encoder, and said digital expansion means is a DPCM decoder.

5. The apparatus according to claim 3, further comprising bit number setting means for setting the number of compression bits such that a larger number of compression bits is set step-wise for a shorter instruction delay time based on the number of compression bits when said instruction delay time is a maximum delay time.

* * * * *